United States Patent
Huang et al.

(10) Patent No.: US 7,660,252 B1
(45) Date of Patent: Feb. 9, 2010

(54) SYSTEM AND METHOD FOR REGULATING DATA TRAFFIC IN A NETWORK DEVICE

(75) Inventors: Yiren Huang, San Jose, CA (US); Robert Hoffman, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 692 days.

(21) Appl. No.: 11/083,884

(22) Filed: Mar. 17, 2005

(51) Int. Cl.
*H04J 3/14* (2006.01)

(52) U.S. Cl. .................. 370/235; 370/231; 370/412; 709/235; 709/240

(58) Field of Classification Search .............. 370/229, 370/235, 409, 466, 395; 709/235, 240
See application file for complete search history.

(56) References Cited

U.S. PATENT DOCUMENTS

| | | | | |
|---|---|---|---|---|
| 4,506,358 A | * | 3/1985 | Montgomery | 370/409 |
| 5,745,489 A | * | 4/1998 | Diaz et al. | 370/395.7 |
| 6,724,725 B1 | * | 4/2004 | Dreyer et al. | 370/231 |
| 6,990,529 B2 | * | 1/2006 | Yang et al. | 709/235 |
| 7,277,962 B2 | * | 10/2007 | Zhang et al. | 709/240 |
| 2004/0221032 A1 | | 11/2004 | Bernstein et al. | |
| 2004/0223452 A1 | | 11/2004 | Santos et al. | |
| 2005/0157751 A1 | * | 7/2005 | Rabie et al. | 370/466 |

\* cited by examiner

*Primary Examiner*—Albert T Chou
(74) *Attorney, Agent, or Firm*—Trellis IP Law Group, PC

(57) ABSTRACT

A method and a system for controlling a packet passing through a network device are provided. The method includes timestamping the packet with an arrival time when it arrives at the network device, and determining the time the packet spends in the network device. The time spent is calculated by comparing the arrival time stamp and the exit time stamp. Subsequently, the packet is labeled, based on a function of the determined time spent in the network device. The packet can be labeled, to be dropped, suppressed or temporarily stopped. The system for controlling the packet passing through the network device comprises the means for performing the above mentioned steps.

20 Claims, 7 Drawing Sheets

SYSTEM AND METHOD FOR REGULATING DATA TRAFFIC IN A NETWORK DEVICE

BACKGROUND OF THE INVENTION

1. Field of Invention

The embodiments of the invention relate in general to data packet traffic regulation in networks. More specifically, the embodiments of the invention relate to methods and systems for data packet regulation in network devices such as data switching systems and routers.

2. Description of the Background Art

The need to transfer data such as work files, audio files, etc., has increased exponentially in today's world. This has given rise to the concept of connecting data sources and data receivers such as computer workstations, data servers, etc., in a network such as a local area network (LAN), a wide area network (WAN), and the Internet. The data transfer between the data source and data receiver takes place with the help of a network device, which enables the data transfer. Data sources and data receivers are connected to the network device through communication channels. Examples of network devices include routers, switches and bridges.

When a user wants to send a data packet from a data source to a data receiver, the data packet transfer in a network device takes place in the following manner: The user sends the data packet from the data source to the network device, which then transfers the data packet to the relevant data receiver with the help of a data switch. A data switch can be a switching device such as a combined input output queue (CIOQ) switch or a virtual output queue (VOQ) switch and the like.

The network device has a communication channel, which has a particular capacity, to transfer data packets. Whenever there is congestion in the network device, data packets accumulate in the network device, which gets flooded with data packets. The data packets accumulate in a buffer provided in the network device, which accommodates these data packets before they are sent to the data packet receiver. However, if the number of accumulated data packets exceeds the capacity of the buffer, it leads to severe congestion in the network device. The flooding of data packets results in the formation of a data packet queue at the input and the output of the network device. The formation of a queue at the network device may hamper the smooth transfer of data packets in the network and result in delays and losses in the transmission of data packets. It also hampers the working of the network device.

Conventional techniques for reducing congestion include either dropping or suppressing the data packets in the event of congestion at the network device. The decision to drop, mark to indicate congestion, or suppress data packets can only be taken after measuring the queue length formed by the data packets at the network device.

However, the queue length is not an exact indication of the magnitude of the congestion in the case of a complex network with more than one input and output queue at the network device. Further, it is difficult to simultaneously measure the queue length of different queues. Consequently, measuring the congestion level accurately is difficult. Moreover, in this kind of mechanism, data packets are evenly distributed in the buffers, in the case of congestion, to maximize buffer utilization, which, in turn, hinders an accurate assessment of the extent of congestion in the network device. Further, the queue length is not an exact measure of the congestion level, to evaluate the variable rate of data transfer at the output ports of the network device.

DETAILED DESCRIPTION OF EMBODIMENTS OF THE INVENTION

The various embodiments of the invention provide a method, a system, and a machine-readable medium for regulating flow of packets in a computer network. The data transfer between computers in a network takes place through a network device such as a router or a switch connecting the computers. The flow of packets needs to be monitored, and if the flow of the packets exceeds the capacity of the network device, the packet flow has to be suppressed to protect the core network. The various embodiments of the present invention address this problem and provide a method and system to monitor and regulate the data traffic in a network. The parameter for the process of monitoring is a function of the time spent by the packet in the network device. Further, the packets are labeled accordingly, to either drop, suppress, or stop temporarily, based on this parameter.

Figure 1:
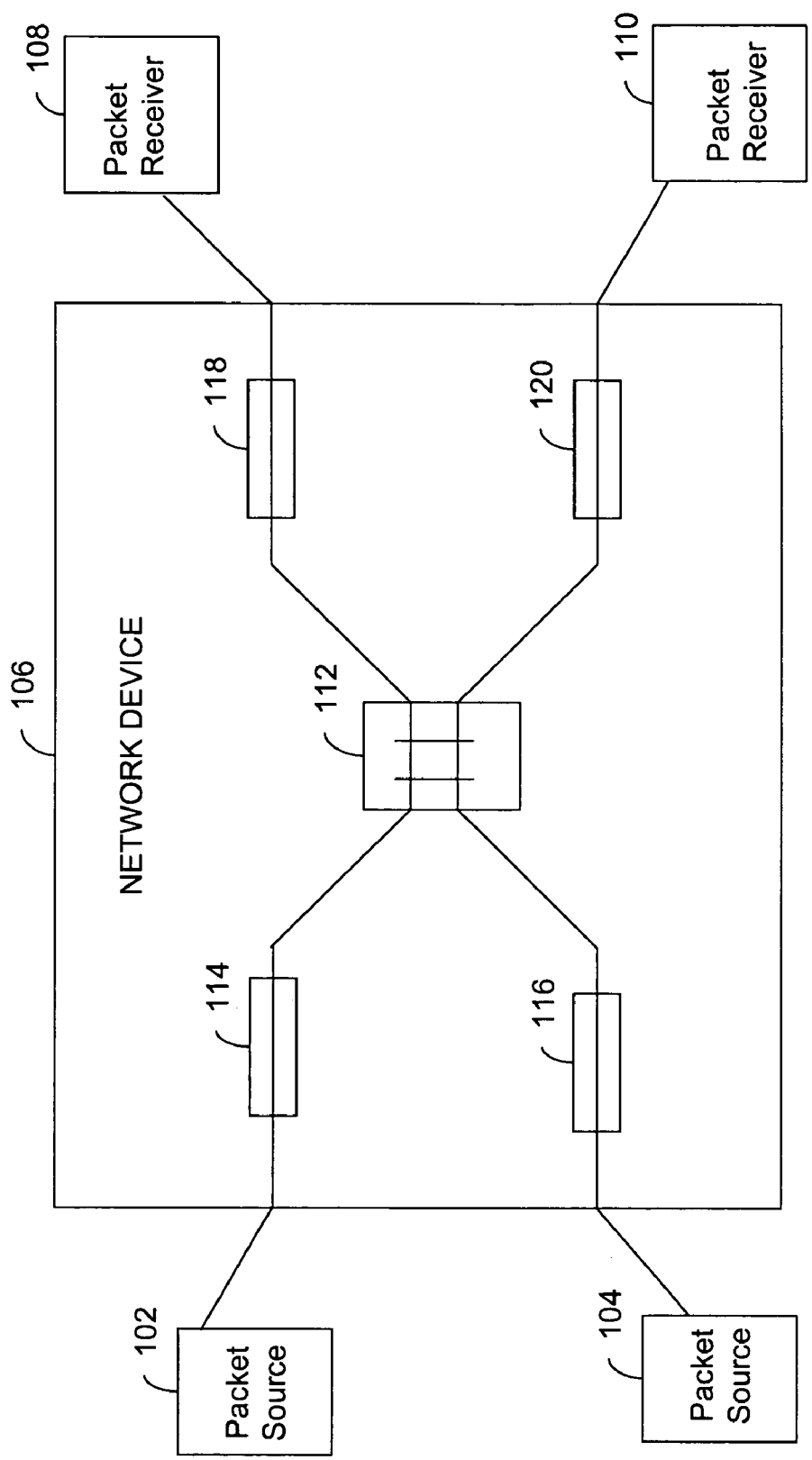
FIG. 1 illustrates a network environment, in accordance with an exemplary embodiment of the present invention.

FIG. 1 depicts a computer network comprising packet sources 102 and 104, which are connected to a network device 106 through communication channels. The computer network can be a local area network, wide area network, a virtual area network, and the like. Various packet receivers, i.e., destinations for the packets, in the network, such as packet receiver 108 and 110, are also connected to network device 106 through communication channels. The transfer of packets between packet sources 102 and 104 and packet receivers 108 and 110 within a network takes place with the help of a data switch 112, present in network device 106. Data switch 112 receives various packets from packet sources such as packet source 102, and transfers them to respective packet receivers such as packet receiver 108. In an embodiment of the invention, packet source 102 and packet receiver 108 include general-purpose computers, personal computers, servers, and the like. In various embodiments of the invention, network device 106 can be a router, switch or bridge. In an embodiment of the invention, data switch 112 is a Combined Input Output Queue (CIOQ) switch. In an embodiment, the CIOQ switch can be a part of Catalyst 6000 switches manufactured by Cisco Technology, Inc. In another embodiment of the invention, data switch 112 can be a virtual output queue (VOQ) switch, and a storage area network (SAN) switch.

When a user wants to send a packet to a packet receiver within the network, the transfer takes place in the following manner. In an exemplary embodiment of the invention, the user sends the packet from packet source 102. The packet is transferred to data switch 112 that is present in network device 106. From data switch 112, the packet is switched to packet receiver 108.

Every network device has a communication channel of particular capacity to transfer data. Whenever there is traffic congestion, i.e., the packets are accumulating in network device 106, network device 106 is supposed to be flooding with the packets. The problem of flooding is caused not only by the packet source side of the network, that is when the packet is transferred by a user from packet source 102 to network device 106, but it is also due to data transfer from network device 106 to packet receiver 108. The flooding of the packets result in the formation of a packet queue at the input and the output of the network device. The packet queue formed at the input of data switch 112 is referred to as an input queue, while the packet queue formed at the output of data switch 112 is referred to as an output queue. In one embodiment of the invention, there is the formation of input queues 114 and 116 and output queues 118 and 120 at data switch 112, due to the flooding at network device 106. The formation of a queue at network device 106 results in a delay in packet transfer.

In an embodiment of the invention, network device 106 is provided with a packet buffer at the input and output of data switch 112. The buffer accommodates packets that are present in the queue. However, network device 106 gets congested when the queue length increases, in other words, the number of packets present in the queue is greater than the capacity of the buffer. Consequently, the packets present in the queue may need to be dropped. In another embodiment of the invention, the incoming packets, to network device 106, can be stopped temporarily to lessen the congestion of the packets at data switch 112. Accordingly, the various embodiments of the invention provide methods and systems to monitor the congestion level, to protect the network. Further, in the case of congestion beyond a certain threshold, appropriate actions can be taken to reduce the congestion.

The various embodiments of the invention monitor the congestion level by measuring the time spent by the packet at network device 106. If the packet spends a considerable length of time in the queue at network device 106, the accumulation of packets in the buffer also goes up, in other words, the queue length increases. If the time the packet spends in network device 106 exceeds regulating level criteria, the network traffic is said to be congested. Subsequently, appropriate actions, such as dropping, suppressing or temporarily stopping packets, are performed.

Figure 2:
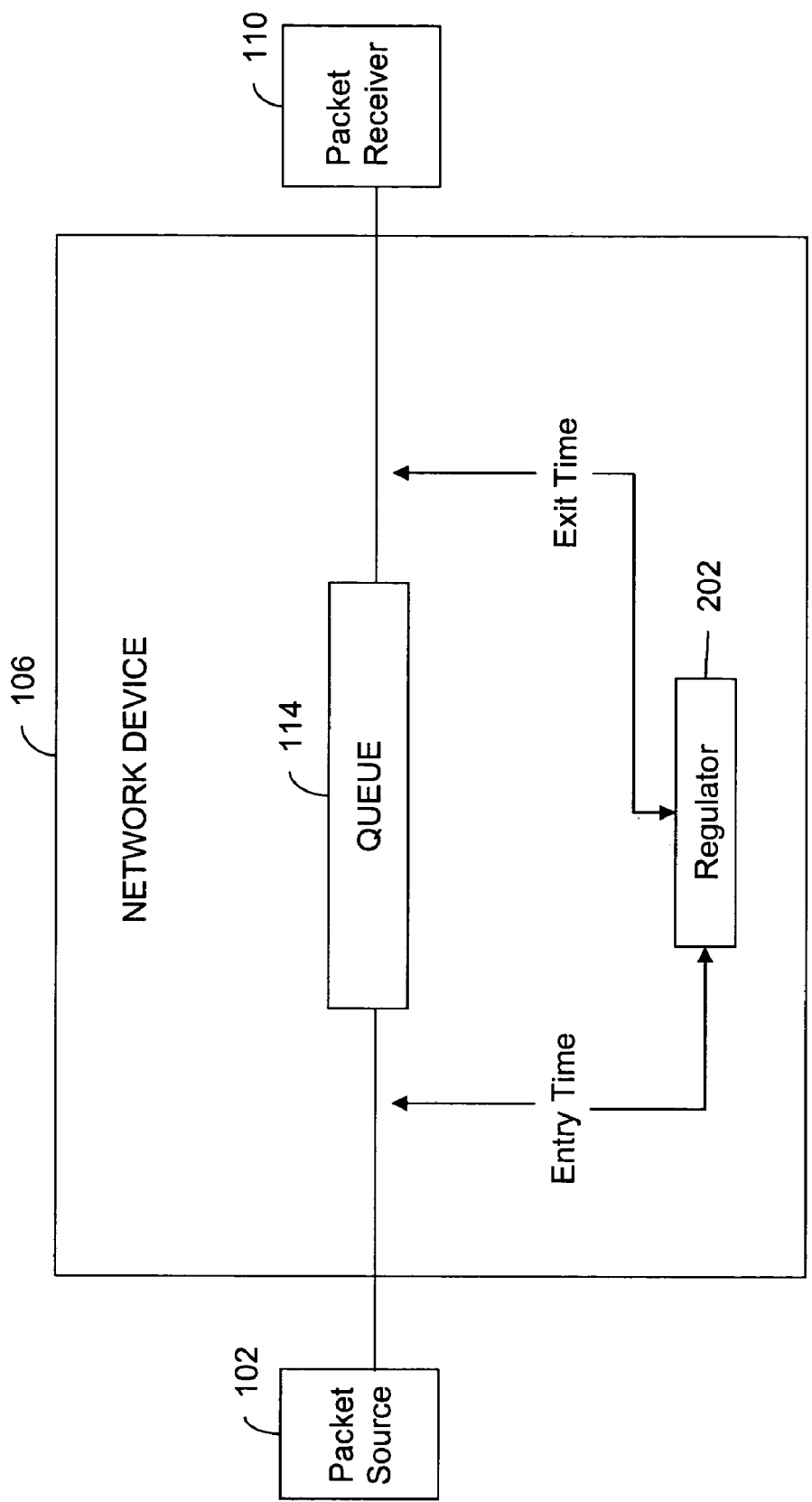
FIG. 2 illustrates a system, to determine the time spent by a packet in a queue in a network device, in accordance with an exemplary embodiment of the present invention.

Various embodiments of the present invention provide a regulator to monitor and regulate the data traffic in network device 106. FIG. 2 shows a regulator 202, by means of which the time spent by the packet in the queue at data switch 112 can be determined. The packet entering network device 106 is timestamped on arrival by regulator 202. When the packet leaves network device 106, the exit timestamp is compared with the arrival timestamp, and the total time spent by the packet in network device 106 is determined. In one of the exemplary embodiments of the invention, regulator 202 determines the time spent by the packet in input queue 114 at data switch 112. In another embodiment of the invention, regulator 202 determines the time spent by the packet in output queue 118. In yet another embodiment, time spent by the packet in input queue 114 and output queue 118 is measured. Further, the user configures regulating level criteria for regulator 202, based on a function of the time spent by the packet in the queue. Exemplary functions of the time spent by the packet in a queue are described later in this section. The regulating level criteria is used to label the packet, and to drop, suppress or stop it temporarily. This enables a reduction in congestion levels.

Figure 3:
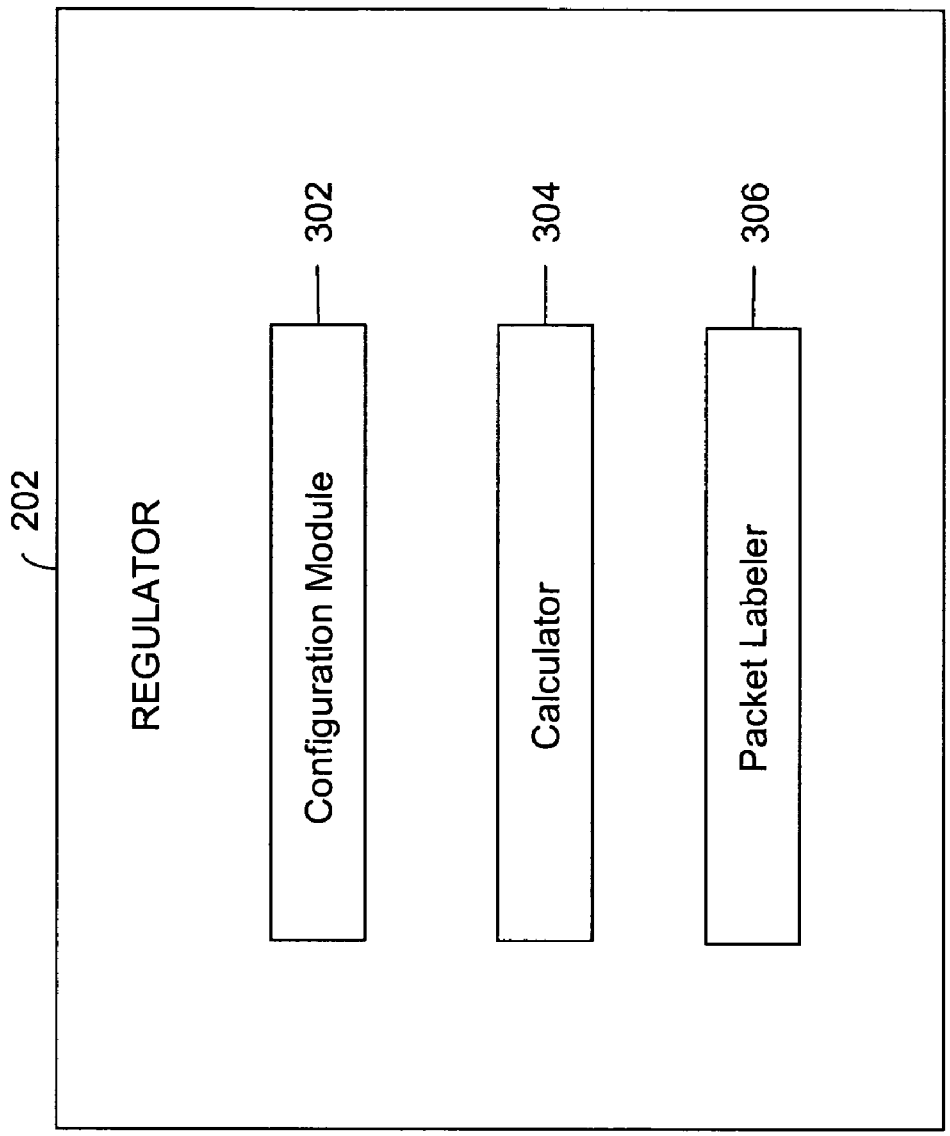
FIG. 3 depicts a packet flow regulator, in accordance with an exemplary embodiment of the present invention.

Regulator 202 includes various components that monitor the network traffic and regulate the traffic. FIG. 3 shows the various components of regulator 202, in accordance with an embodiment of the invention. Regulator 202 includes a configuration module 302, with the help of which a user can configure a regulating level for the packets. This regulating level is based on the time spent by a packet in the queue in network device 106. The queue can be an input queue, an output queue, and their combination thereof. In various embodiments of the invention, the regulating level refers to a threshold function of time spent, beyond which the packets can be labeled, to be dropped, suppressed or stopped temporarily. A calculator 304, present in regulator 202, calculates the time spent by the packet in the input and output queues at data switch 112 in network device 106. In various embodiments of the invention, calculator 304 also computes the function of the time spent. In an embodiment of the invention, configuration module 302 can include a command line interface (CLI). One can configure the parameters through CLI or through any other type of software user interface.

Once the time spent by the packet in the queue is known, and the regulating level is configured, the packet flow can be regulated with the help of a packet labeler 306. Packet labeler 306 generates instructions according to the labeling policy pertaining to the packets. For example, if the time spent by the packet in the queue exceeds the regulating level, the packet can be labeled, to be dropped until the congestion level reduces. In another embodiment of the invention, the packets are labeled to be temporarily stopped until the congestion level reduces to an acceptable limit. In an embodiment of the invention, the labeling policy can be defined by a user via a CLI.

In various embodiments of the invention, each of the components of regulator 202 can be implemented as a part of the software, hardware, firmware, and their combination thereof.

Figure 4:
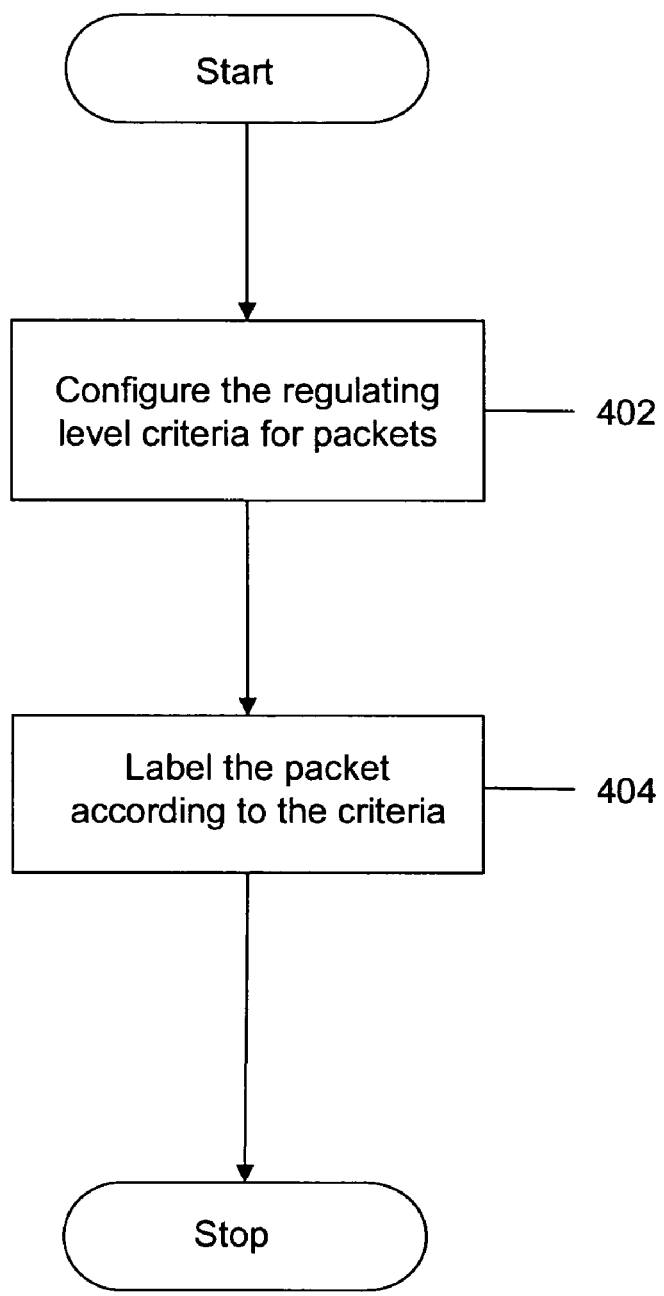
FIG. 4 is a flow chart depicting the requisite steps in the packet flow regulation method, in accordance with one embodiment of the present invention.

In one of the embodiments of the invention, FIG. 4 illustrates a flow chart, detailing the steps involved in the method of regulating the packet flow. Regulator 202 allows the user to configure regulating level criteria with the help of configuration module 302 at step 402. Details of regulating level criteria are described later in the description section. Subsequently, regulator 202 labels the packets accordingly, with the help of packet labeler 306 at step 404. If the packet exceeds regulating level criteria, packet labeler 306 labels the packet, based on the commands given to regulator 202, such as to drop, suppress or stop the packet temporarily. Further, if the packets do not exceed the regulating level, the packets are transmitted to their destination, i.e., to the appropriate packet receiver.

Figure 5:
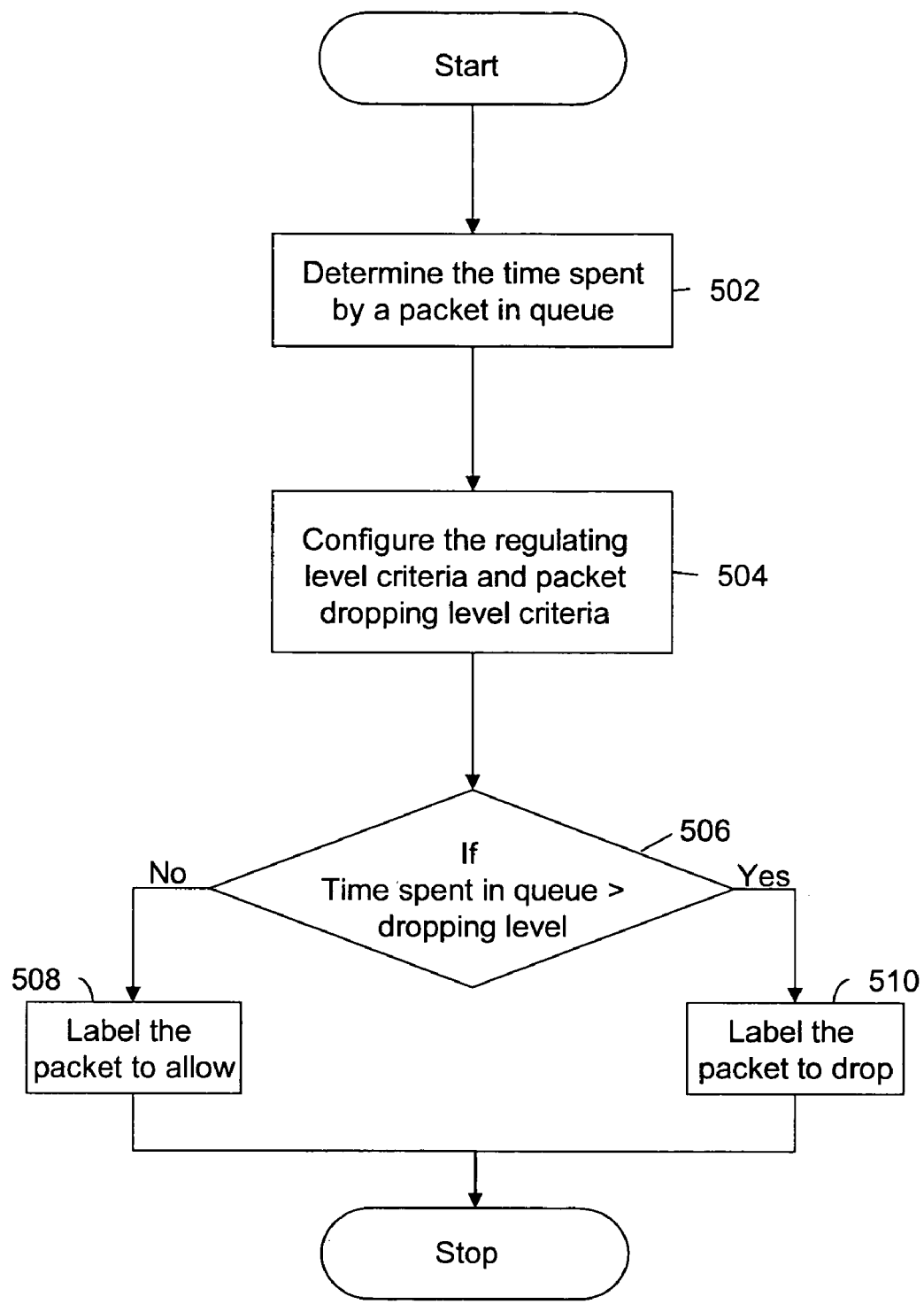
FIG. 5 is a flow chart depicting the requisite steps in the packet flow regulation method, in accordance with another embodiment of the present invention.

In one of the embodiment of the invention, regulating level criteria includes packet dropping level criteria, i.e., the packet is dropped if the criteria is surpassed. FIG. 5 depicts a flowchart giving the steps involved in the method of regulating the packets, based on the packet dropping level criteria, in another embodiment of the invention. Regulator 202 determines the time spent by the packets in the queue at data switch 112 at step 502, with the help of calculator 304. In an embodiment of the invention, the time spent is computed by comparing the arrival-timestamp and the exit-timestamp in the queue. Further, the packet dropping level criteria, for the packets is configured at step 504. The user can configure regulating level criteria for the packets and the packet dropping level criteria by using configuration module 302. Packet dropping level criteria includes defining a packet dropping level, i.e., a threshold time spent, beyond which the packet is to be dropped. Once the time spent by the packets in the queue at data switch 112 is determined, packet labeler 306 checks if the time spent by the packet is higher than the packet dropping level, at step 506. If the time spent by the packet in the queue is higher than the packet dropping level, packet labeler 306 labels the packet, to be dropped at step 510. If the time spent by the packet in the queue is below the packet dropping level, packet labeler 306 labels the packet, so that it is allowed at step 508.

In an embodiment of the invention, regulating level criteria for the packets is based on the total time spent by the packet in the queue at data switch 112. A packet can be labeled to be dropped, if the total time spent by the packet in the queue exceeds the regulating level configured by the user. When the total time spent by the packet in the queue exceeds the configured regulating level, it is an indication that the queue is overflowing and the queue length is exceeding the buffer limit. In an exemplary embodiment, the function of time used for regulating the data packet is the total time T spent in the queue. If T exceeds a threshold $T_{max}$, then the packets are labeled to be dropped. Otherwise, the packets are allowed. In various embodiments of the invention, the queue can be the input queue, output queue, or their combination thereof.

Time T is computed as follows:
$T = T_{out} - T_{in}$ is the total time spent by the packet in the queue;
Where, $T_{in}$: Timestamp at arrival of the packet at the data switch.
$T_{out}$: Time when the packet left the data switch In another embodiment of the invention, the regulating level criteria for labeling the packets are based on the weighted moving average of the time spent by the packet in the queue at data switch 112. The advantage of using the weighted moving average for labeling is that it takes care of the sudden spikes generated in the time spent by the packet during the packet transfer. The weighted moving average takes into account the total time spent by a number of packets in the queue at data switch 112, along with the total time spent by an individual packet in the queue. In this manner, the sudden spikes generated during the time spent by the packet in the queue can be absorbed. The packet is labeled, to be dropped, if the regulating level of the weighted moving average time spent in the queue is surpassed. The concept of weighted moving average can be further explained as follows:
$T_{(i)} = T_{out} - T_{in}$ is the time spent by an $i^{th}$ packet in a queue;
Where, $T_{in}$: Time when the packet entered the data switch queue
$T_{out}$: Time when the packet left the data switch
And, $T_{ave} = \Sigma T_{(i)}/(n)$; where the sum takes into account the time spent by each of the packets, where the packet number starts from i=1, n
For example, $T_{ave}$ for five packets is $T_{ave(5)} = (T_{(1)} + T_{(2)} + T_{(3)} + T_{(4)} + T_{(5)})/5$
The weighted average time for 'i' packets is defined as:

$$T_{ave(i)} = T_{ave(i-1)} * (1-w) + T_{(i)} * w$$

Where 'w' is a weight factor, which is configured by the user to indicate the importance the user wants to give to either the time spent by the $i^{th}$ packet or the average time spent by the previously passed packets.

The regulating level criteria includes a threshold, $T_{max}$, which is the threshold limit of time spent by the packet in a queue at the data switch, so that
If $T_{ave(i)} > T_{max}$, the packets are labeled, to be dropped.
If $T_{ave(i)} < T_{max}$, the packets are labeled, to be allowed to pass through.

In another embodiment of the invention, the labeling of the packets takes place according to the Random Early Dropping (RED) algorithm. In various embodiments of the invention, the RED algorithm uses the weighted moving average of the time spent by the packet in the queue at data switch 112, as a parameter for the packet dropping or packet marking. A user can configure the regulating level criteria to regulate the packet flow according to the RED algorithm with the help of configuration module 302. The RED algorithm can be described as follows:

The RED algorithm uses the weighted average time as a parameter, as explained above in detail. Moreover, in the case of the RED algorithm, the labeling of packets is based on a probability function. Packets are labeled, to be dropped, when the threshold time limit is surpassed. Packets are labeled, to be suppressed temporarily, if the packets are reaching the threshold time limit. Packets are labeled, to be allowed to pass through, if the threshold time limit is neither surpassed nor reached. This concept is explained hereinafter.

Figure 6:
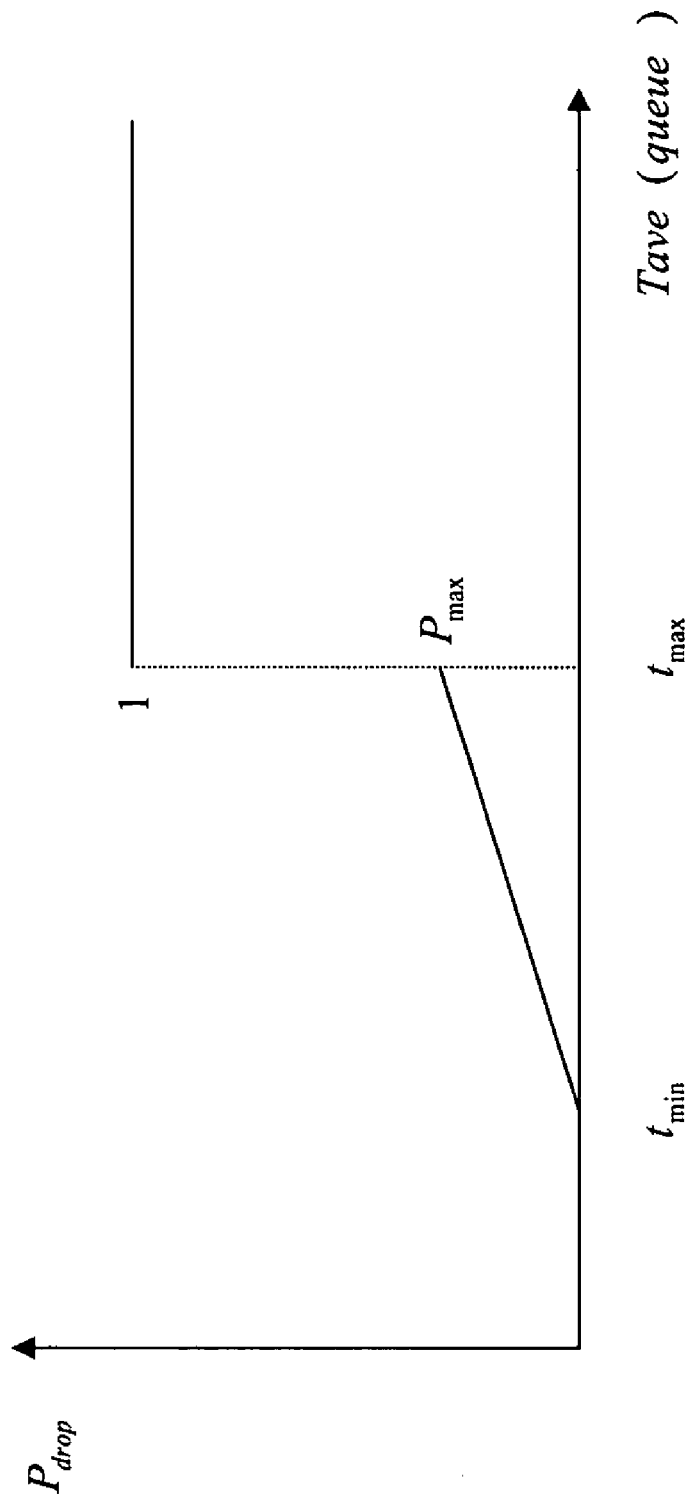
FIG. 6 is a graph of probability pertaining to the dropping of a packet, with respect to the weighted average of the time spent by the packet in a queue at a data switch.

The regulating level criteria include a threshold, $T_{max}$, which is the maximum threshold limit of time spent by the packet in a queue at the data switch. Further, there is a threshold, $T_{min}$, which is the minimum threshold limit of time spent by the packet in a queue at the data switch, so that
$T_{ave(i)} < T_{min}$: no packet is dropped
$T_{ave(i)} > T_{max}$: all the further packets are dropped
And if, $T_{min} < T_{ave(i)} < T_{max}$; the probability of labeling the packet, to be dropped, is based on a probability graph as shown in FIG. 6, where $$T_{ave(i)} = T_{ave(i-1)} * (1-w) + T_{(i)} * w$$

Wherein 'w' is a weight factor, configured by the user. As the $T_{ave(i)}$ increases, the probability of the packet being labeled, to be dropped, also increases, and when $T_{max}$ is approached, the probability of the packet dropping reaches the maximum $P_{max}$, and if the time spent by the packet is greater than $T_{max}$, the probability of dropping the packet is 1. FIG. 6 depicts an exemplary graph of '$P_{drop}$' vs. '$T_{ave}$' wherein,
$P_{drop}$—probability of labeling the packet, to be dropped, according to the criteria
$T_{ave}$—weighted average of the time spent by the packet in a queue When the $T_{ave}$ of the packets increases, it is an indication that there is an increase in network congestion. In order to protect the core network, the algorithm is executed such that, once the intermediate level of threshold $T_{min}$ is crossed, further packets are partially suppressed. Further, if the $T_{ave}$ of the packet is still increasing, there is an increase in the number of packets that are dropped. In an embodiment, the packets to be dropped are selected randomly. Once $T_{max}$ is crossed, all the packets are dropped until the congestion in the network device is reduced.

In one of the modifications to the RED algorithm, the time spent by the packet in the input and output queues can be taken into account independently for the regulating level criteria. In this embodiment of the invention, the time spent by the packet in the input and output queues can be measured independently. This modification to the RED algorithm can be explained as follows:
$T_{(i)} = (T_{output} + vT_{input})$ is the time spent by a packet in a queue
Where, $T_{input}$: Time spent by the packet in an input queue at the data switch
$T_{output}$: Time spent by the packet in an output queue at the data switch
And v is the weighting factor for input queue time.

Further, the definition of the weighted average time remains the same, i.e., $$T_{ave(i)} = T_{ave(i-1)} * (1-w) + T_{(i)} * w$$

wherein 'w' is a weight factor that is configured by the user. Further, the RED algorithm remains the same and follows the same probability as in packet dropping graph, shown in FIG. 6.

In an embodiment of the invention, packet source 102 is also informed about the status of the packets, so that if the packets spend more time in the queue at data switch 112, packet source 102 can stop sending the packets; or if the time spent by the packets is less, then more packets can be sent.

In another embodiment of the invention, the packet flow regulation takes place according to the Weighted Random Early Dropping (WRED) algorithm. The WRED algorithm follows the same RED algorithm and uses the same weighted average time spent by the packet in the queue as a parameter. In addition, the WRED algorithm allows a user to differentiate between the different types of packets, based on the source from which the packets are generated. The user can specify the preference of packets and accordingly configure the packet dropping level criteria for each of the specified type of packets. The types of packets can be standard, premium or high priority. The WRED algorithm preferentially drops the standard type of packets in the event of congestion. However, the probability of dropping the premium or high priority packets is less. In an embodiment, the user can configure the WRED algorithm without considering the preferences for a particular type of packet. In that case, the WRED algorithm works in a similar manner as the RED algorithm.

Figure 7:
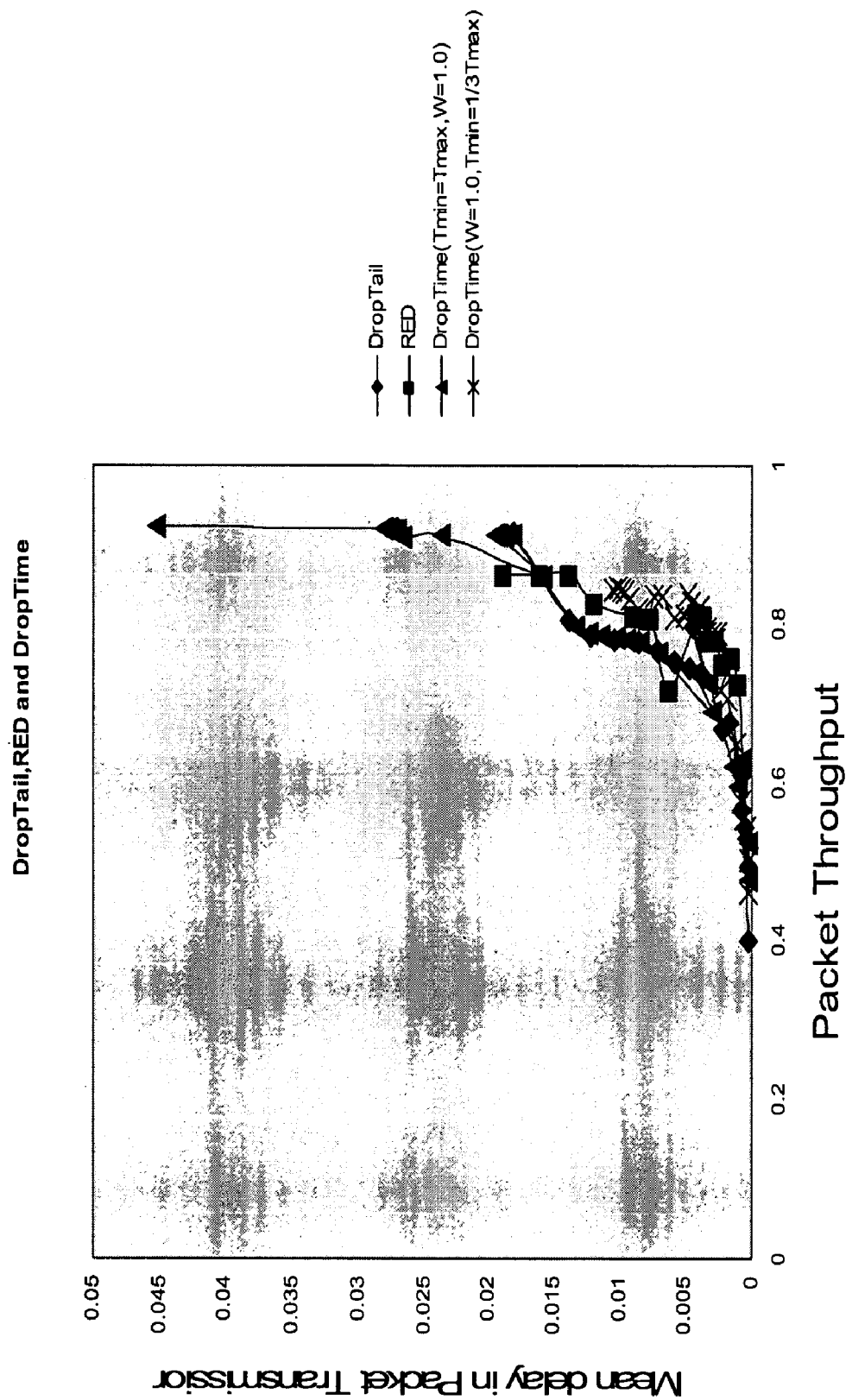
FIG. 7 is a graph illustrating the simulation result for the various data traffic management systems, with respect to the mean delay in packet transmission vs throughput.

The performance of the time based RED algorithm can be compared with the existing queue based network traffic management systems and is plotted as shown in FIG. 7. FIG. 7 depicts simulation results wherein 'mean delay in data transmission' is plotted against 'packet throughput' for various traffic management techniques for a speedup of 1.1. In particular, the performance of the method described in an embodiment of the invention is compared vis-à-vis the tail dropping technique and the conventional RED-based technique. As shown, the method described in an embodiment of the invention leads to significant improvement in performance. In particular, the mean delay in packet transmission for a given packet throughput is lower in the embodiments of the invention vis-à-vis conventional techniques.

Embodiments of the present invention have the advantage that suppressing or dropping the packets, if the specified time limit is reached, can reduce the congestion at network device 106. The embodiments of the invention can be implemented across several network devices, not just a single network device. Moreover, the mean time delay as a result of the new technique for traffic such as TCP is less compared to other active queue management. In particular, the mean delay in packet transmission is smaller.

In addition, the various embodiments of the invention accurately measure the congestion in a complex network, for example, a network with many different input VOQs coupled with different arbitration schemes, such as round robin and weighted round robin or maximum weight matching. The various embodiments of the invention can take into account the arbitration scheme and various input queues to measure congestion.

Further, the various embodiments can be implemented independently on each input queue, independent of the arbitration scheme in place. The various embodiments can also take into account the buffer-to-buffer credit based queue mechanism. This can be achieved, since the time spent by the packet in the network device determined by the regulator can include the time spent by the packet during the buffer-to-buffer credit. Moreover, the parameters associated with the various queues and the arbitration schemes can also be included. The regulation based on the time spent at the network device also ensures better traffic monitoring in the case of bursty traffic. Further, in various embodiments of the invention, packets may be dropped at the input queue rather than at the output queue.

Although the invention has been discussed with respect to the specific embodiments thereof, these embodiments are merely illustrative, and not restrictive, of the invention. For example, a method for regulating the data packet traffic in a network device in a network can include any type of analysis—manual or automatic—to anticipate the needs of data traffic regulation. In some embodiments, a method for controlling a packet passing through a network device or a processor for regulating a flow packets in a network may notify a downstream device of traffic congestion in the network device.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification may contain material which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting multiple video program ID streams, such as on a display screen of the computer, the computer would have suitable instructions (e.g., source code) for allowing a user to display multiple video program ID streams. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain, store, communicate, propagate, or transport the computer program for use by or in connection with the instruction execution system apparatus, system or device. The computer readable medium can be, by way of example only but not by limitation, an electronic, magnetic, optical, or semiconductor system, apparatus, system, device, propagation medium, or computer memory. The computer readable medium may have suitable instructions for presenting multiple video program ID streams, such as on a display screen, or for providing for input or presenting in accordance with various embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for controlling a packet passing through a network device, the method comprising:
   timestamping the packet with an arrival time when the packet arrives at a queue in the network device;
   timestamping the packet with an exit time when the packet exits the queue;
   determining a queue time that is a length of time the packet has been in the queue;
   determining a regulating level for labeling packets, wherein the regulating level is based on a weighted average time, wherein the weighted average time is based on the queue time of the packet, an average queue time of a predefined number of packets that previously spent time in the queue, and a weight factor, and wherein the weight factor gives more weight to either the queue time of the packet or to the average queue time;
   labeling the packet to be dropped if the regulating level is greater than a predefined threshold; and
   processing the packet in the network device based on the labeling.

2. The method of claim 1 wherein the weighted average time is based on an expression Tave(i)=Tave(i−1)*(1−w)+T(i)*w, wherein Tave(i) is the weighted average time, wherein Tave(i−1) is the average queue time, wherein T(i) is queue time of the packet, and wherein w is the weight factor.

3. The method of claim 2 additionally comprising configuring a packet dropping level criteria based on a Random Early Dropping (RED) algorithm, wherein the packet is labeled with a regulating level based on the weighted moving average.

4. The method of claim 2 wherein a criteria for dropping the packet is based on a Weighted Random Early Dropping (WRED) algorithm.

5. The method of claim 1 wherein said processing comprises notifying a downstream device of traffic congestion in the network device.

6. The method of claim 1 wherein the network device comprises a Combined Input Output Queue (CIOQ) switching system.

7. The method of claim 1 wherein said processing comprises temporarily stopping the packet if the packet exceeds regulating level criteria.

8. A system for regulating a flow of packets in a network, the network comprising at least one packet source, at least one packet receiver and a network device, the system comprising:
means for timestamping a packet with an arrival time when the packet arrives at a queue in the network device;
means for timestamping the packet with an exit time when the packet exits the queue;
means for determining a queue time that is a length of time the packet has been in the queue;
means for determining a regulating level for labeling packets, wherein the regulating level is based on a weighted average time, wherein the weighted average time is based on the queue time of the packet, an average queue time of a predefined number of packets that previously spent time in the queue, and a weight factor, and wherein the weight factor gives more weight to either the queue time of the packet or to the average queue time;
means for labeling the packet to be dropped if the regulating level is greater than a predefined threshold; and
means for regulating the flow of the packets based on the labeling.

9. The system of claim 8 further comprises means for determining the time spent by the packet in an input queue at the network device.

10. The system of claim 8 wherein the means for regulating the flow of the packets comprises means for temporarily stopping the packet if the packet exceeds the regulating level criteria.

11. A system for regulating a flow of packets in a network, the network comprising at least one packet source, at least one packet receiver and a network device, the system comprising:
a regulator for:
timestamping a packet with an arrival time when the packet arrives at a queue in the network device;
timestamping the packet with an exit time when the packet exits the queue;
determining a queue time that is a length of time the packet has been in the queue;
a configuration module for determining a regulating level for labeling packets, wherein the regulating level is based on a weighted average time, wherein the weighted average time is based on the queue time of the packet, an average queue time of a predefined number of packets that previously spent time in the queue, and a weight factor, and wherein the weight factor gives more weight to either the queue time of the packet or to the average queue time;
a packet labeler for labeling the packet to be dropped if the regulating level is greater than a predefined threshold; and
a packet processor for processing the packets based on the labeling.

12. The system of claim 11 wherein the network device comprises a Combined Input Output Queue (CIOQ) switching system.

13. The system of claim 11 wherein the packet processor is further operable to temporarily stop the packet if the packet exceeds regulating level criteria.

14. An apparatus for regulating a flow of packets in a network, the network comprising at least one packet source, at least one packet receiver and a network device, the apparatus comprising:
a processor; and
a computer-readable medium including instructions stored thereon, which are executable by the processor, the instructions comprising:
one or more instructions for timestamping the packet with an arrival time when the packet arrives at a queue in the network device;
one or more instructions for timestamping the packet with an exit time when the packet exits the queue;
one or more instructions for determining a queue time that is a length of time the packet has been in the queue;
one or more instructions for determining a regulating level for labeling packets, wherein the regulating level is based on a weighted average time, wherein the weighted average time is based on the queue time of the packet, an average queue time of a predefined number of packets that previously spent time in the queue, and a weight factor, and wherein the weight factor gives more weight to either the queue time of the packet or to the average queue time;
one or more instructions for labeling the packet to be dropped if the regulating level is greater than a predefined threshold; and
one or more instructions for processing the packet in the network device based on the labeling.

15. The apparatus of claim 14 wherein the computer-readable medium further comprises one or more instructions for temporarily stopping the packet if the packet exceeds regulating level criteria.

16. A computer-readable medium including instructions stored thereon, which are executable by a processor for regulating a flow of packets in a network, the network comprising at least one packet source, at least one packet receiver and a data switching system, the computer-readable storage device comprising:
one or more instructions for timestamping the packet with an arrival time when the packet arrives at a queue in the network device;
one or more instructions for timestamping the packet with an exit time when the packet exits the queue;
one or more instructions for determining a queue time that is a length of time the packet has been in the queue;
one or more instructions for determining a regulating level for labeling packets, wherein the regulating level is based on a weighted average time, wherein the weighted average time is based on the queue time of the packet, an average queue time of a predefined number of packets that previously spent time in the queue, and a weight factor, and wherein the weight factor gives more weight to either the queue time of the packet or to the average queue time;

one or more instructions for labeling the packet to be dropped if the regulating level is greater than a predefined threshold; and one or more instructions for processing the packet in the network device based on the labeling.

17. The computer-readable medium of claim 16 wherein said one or more instructions for processing comprises one or more instructions for dropping the packet from the network device.

18. The computer-readable medium of claim 16 wherein said one or more instructions for processing comprises one or more instructions for setting a priority for the packet.

19. The computer-readable medium of claim 16 wherein said one or more instructions for processing comprises one or more instructions for notifying a downstream device of traffic congestion in the network device.

20. The computer-readable medium of claim 16 said processing comprises temporarily stopping the packet if the packet exceeds regulating level criteria.

* * * * *

UNITED STATES PATENT AND TRADEMARK OFFICE
CERTIFICATE OF CORRECTION

PATENT NO.       : 7,660,252 B1                                           Page 1 of 1
APPLICATION NO. : 11/083884
DATED            : February 9, 2010
INVENTOR(S)      : Huang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 974 days.

Signed and Sealed this

Fourth Day of January, 2011

David J. Kappos
*Director of the United States Patent and Trademark Office*